United States Patent
Davis et al.

(10) Patent No.: US 9,271,511 B2
(45) Date of Patent: Mar. 1, 2016

(54) FIRMING PROCESS TO ENHANCE TEXTURE OF THERMALLY PROCESSED IQF FRUITS AND VEGETABLES

(75) Inventors: Bernadette Revel-McInnis Davis, Pleasant Hill, CA (US); Agnesia Gunterus, Dublin, CA (US)

(73) Assignee: Del Monte Foods, Inc., Walnut Creek, CA (US)

( * ) Notice: Subject to any disclaimer, the term of this patent is extended or adjusted under 35 U.S.C. 154(b) by 670 days.

(21) Appl. No.: 13/220,357

(22) Filed: Aug. 29, 2011

(65) Prior Publication Data

US 2013/0052318 A1 Feb. 28, 2013

(51) Int. Cl.
| | |
|---|---|
| *A23B 7/045* | (2006.01) |
| *A23B 7/04* | (2006.01) |
| *A23L 3/10* | (2006.01) |
| *A23L 1/212* | (2006.01) |
| *A23B 7/005* | (2006.01) |
| *A23L 3/365* | (2006.01) |
| *A23B 7/08* | (2006.01) |
| *A23B 7/154* | (2006.01) |

(52) U.S. Cl.
CPC . *A23B 7/04* (2013.01); *A23B 7/005* (2013.01); *A23B 7/045* (2013.01); *A23B 7/0433* (2013.01); *A23B 7/085* (2013.01); *A23B 7/154* (2013.01); *A23L 1/2123* (2013.01); *A23L 3/10* (2013.01); *A23L 3/365* (2013.01)

(58) Field of Classification Search
CPC ........ A23B 7/045; A23B 7/085; A23B 7/005; A23L 1/2123; A23L 3/10; A23L 3/365
USPC ......... 426/131, 324–326, 639, 407, 489, 518, 426/521, 524
See application file for complete search history.

(56) References Cited

U.S. PATENT DOCUMENTS

| | | | |
|---|---|---|---|
| 2,492,735 A | 12/1949 | Conard et al. | |
| 3,136,642 A * | 6/1964 | Backinger et al. | 426/327 |
| 3,245,807 A * | 4/1966 | Colby | 426/325 |
| 4,336,273 A | 6/1982 | Lee | |

(Continued)

FOREIGN PATENT DOCUMENTS

EP 0 853 886 7/1998

OTHER PUBLICATIONS

Carle et al., EP 0853886 A2 EPO English translation (German version from Aug. 29, 2011 IDS).*

(Continued)

*Primary Examiner* — Drew Becker
(74) *Attorney, Agent, or Firm* — Dilworth Paxson LLP

(57) ABSTRACT

Thermally processed fruits and vegetables are softer in texture than fresh. It is challenging to obtain acceptable texture from thermally processed IQF fruits and vegetables. The soaking method of the invention enhances the texture of high quality IQF fruits and vegetables before thermal processing resulting in a processed, shelf-stable fruit or vegetable product with significantly improved texture. When compared to other traditional firming methods using calcium salts added directly to the pack medium or finished product, or using a food enzyme, such as pectinmethylesterase (PME), the soaking method yields fruit and vegetable products with significantly better post-cook textures. Using this method will also enable manufacturers of shelf-stable fruit and vegetable products to use IQF ingredients in continuous year-round production.

20 Claims, 5 Drawing Sheets

(56) References Cited

U.S. PATENT DOCUMENTS

| | | | | |
|---|---|---|---|---|
| 4,879,127 | A | * | 11/1989 | Liu et al. .................. 426/325 |
| 5,258,193 | A | * | 11/1993 | Inagaki .................... 426/524 |
| 5,332,589 | A | | 7/1994 | Hinnergardt et al. |
| 5,576,046 | A | * | 11/1996 | Ellis ........................ 426/615 |
| 5,607,712 | A | * | 3/1997 | Bourne .................... 426/321 |
| 5,645,879 | A | | 7/1997 | Bourne |
| 5,843,511 | A | | 12/1998 | Bourne |
| 5,939,117 | A | | 8/1999 | Chen et al. |
| 6,387,438 | B1 | * | 5/2002 | Kato ........................ 426/639 |
| 6,524,640 | B1 | * | 2/2003 | Sinha ...................... 426/639 |
| 8,178,146 | B2 | * | 5/2012 | Sinha et al. ............. 426/323 |
| 2002/0031598 | A1 | * | 3/2002 | Lukas et al. ............. 426/640 |
| 2004/0065094 | A1 | | 4/2004 | Ormerod et al. |
| 2007/0048419 | A1 | * | 3/2007 | Noda et al. .............. 426/321 |
| 2009/0162504 | A1 | * | 6/2009 | Anand et al. ............ 426/241 |
| 2011/0159147 | A1 | * | 6/2011 | Baba et al. .............. 426/50 |
| 2011/0318471 | A1 | * | 12/2011 | Anand et al. ............ 426/615 |

OTHER PUBLICATIONS

Harrison et al., Preserving Food: Freezing Fruit, The University of Georgia (Jul. 2000).*
21 CFR-2012, vol. 2, section 145 Canned Fruits (section last amended Mar. 24, 1998).*
Calcium Lactate MSDS (Mar. 17, 2005).*
Luna-Guzman et al., Comparison of calcium chloride and calcium lactate effectiveness in maintaining shelf stability and quality of fresh-cut cantaloupes, 19 Postharvest Biology and Technology p. 61-72 (2000).*
Product Data Sheet for NovoShape®, valid from Jul. 6, 2007, by Novozymes A/S, pp. 1-2.
Product Data for Puracal® PP/USP, by Purac, Rev. No. 12/2204, pp. 1-2.
Akhtar, Attiq et al. "Effect of Calcium Chloride Treatments on Quality Characteristics of Loquat Fruit During Storage" Pak. J. Bot., 42(1): pp. 181-188, 2010.

* cited by examiner

FIRMING PROCESS TO ENHANCE TEXTURE OF THERMALLY PROCESSED IQF FRUITS AND VEGETABLES

FIELD OF THE INVENTION

The invention generally relates to processes for enhancing the texture of thermally processed IQF fruits and vegetables. The invention provides processed fruit or vegetable products with improved visual and tactile texture without using calcium with enzyme or dip/spray treatments. The method minimizes texture degradation of fruits and vegetables resulting from thermal processing and from storage. The method implements IQF ingredients, which permits year round production schedules.

BACKGROUND OF THE INVENTION

Fresh fruits and vegetables typically have a very short harvest season and spoil quickly. Canning is one method of preserving perishable fruits and vegetables. During post-harvest production, canned fruits and vegetables are packed in water, or a liquid syrup, or juice or brine, hermetically sealed, and thermally processed to achieve commercial sterility. Production of canned fruits and vegetables typically takes place within days or weeks of harvest. There is a strong commercial interest to be able to pack canned items throughout the year, not just during harvest. One method of year-round production is to use frozen fruits and vegetables in place of fresh produce in canning operations. However, when compared to fresh produce, frozen fruits and vegetables that are later thermally processed have relatively poor texture. Canning frozen fruits and vegetables worsens the texture because the thermal process softens the produce further. For these reasons, there is also a strong commercial interest in developing a method that would allow production of canned items with consumer accepted texture from individually quick frozen ("IQF") fruits and vegetables.

Some fruit and vegetable manufacturers add calcium salts to certain products to improve texture. The FDA specifies which calcium salts are allowed in food products. For example, the Standard of Identity for canned berries allows for inclusion of calcium salts. Federal Regulations (21 C.F.R. §145.120) allow calcium salts as firming agents provided that the calcium salt added is no more than 0.035 percent of the weight of the finished canned berries. Among the products that are allowed by the FDA to contain calcium salts for firming, adding calcium is considered common practice, but it is not universal in the industry.

Calcium salts may be added to products using one of the following methods: spraying or dipping fruits or vegetables as pretreatment and adding calcium in the topping of finished products. Existing manufacturing techniques to enhance texture and firmness of fruits and vegetables produce soft fruits and vegetables. For example, U.S. Pat. No. 5,939,117 teaches application of a preservative of calcium ions, ascorbate ions—or both—as a solution or in dry form to fresh fruit, such as apple slices, and then storing the fruit covered with the preservative in a container between −7° C. and 30° C. The preservative can be applied by spraying, dipping, sprinkling, tossing, immersing, or drenching. Immersing or dipping the fruit must be limited to no more than 5 minutes because the preservatives can adversely impact fruit flavor.

In another example, U.S. Pat. No. 4,336,273 teaches preserving fruit or vegetables by exposing them to a spray, vapor, or pool of organic compounds, such as, aldehydes, amides, esters, hydrocarbons, halogenated hydrocarbons, ketones, etc., for 10-20 minutes between 0° C. to 75° C. Preservation with this technique requires washing or rinsing the organic compound from the fruit or vegetable prior to heat processing. The flavor of the fruit or vegetable may be adversely affected by overexposure to the organic compound if not washed or rinsed properly.

In yet another example, U.S. Pat. Nos. 5,645,879 and 5,843,511 teach blanching fruits and vegetables before conventional sterilization. Blanching may occur in a solution with food-grade multivalent salt compounds or food-grade acids—or both—and must be carefully regulated to avoid adversely affecting firmness of the fruit or vegetable. Blanched fruits or vegetables must also then be properly cooled by immersion in cold water to stop enzyme activity on the flesh of the fruit or vegetable.

In a further example, European Patent Application No. 0853886 teaches wetting fresh or frozen fruit with an aqueous system containing at least as much sugar and as many calcium ions as the liquid phase of the fruit for no less than 2 days at temperatures above the freezing point of the aqueous system and less than 10° C.

The aforementioned processes have the following disadvantages: soft post-preservation texture and complex manufacturing steps, such as, sensitive blanching temperatures, precise rinsing schedules for food-grade salts or acids to avoid flavor degradation, or use of organic compounds that must be carefully rinsed at precise times.

Consumers are becoming more health conscious. Demand for fruits and vegetables in daily consumption have increased. There is a strong commercial interest to have year-round industrial processing capacity for preserving high-quality fresh fruits and vegetables.

There is currently no method available that allows manufacturers to thermally process IQF fruits or vegetables that yield an acceptable texture post-sterilization. The invention enables this. It provides firmly-textured, high quality fruit and vegetable products after thermally processing IQF products.

SUMMARY OF THE INVENTION

Illustrative embodiments of the invention include processes for enhancing the texture of thermally-processed IQF fruits and vegetables. More specifically, the various embodiments provide a method for enhancing the quality of thermally-processed IQF fruits or vegetables to improve texture and/or integrity.

Firming is an additional step in the production of processed fruits and vegetables. Typical preliminary processing steps—particular to each fruit or vegetable to prepare it for canning—must be executed (e.g. washing, peeling, sorting, and slicing) prior to firming. Most of the preparation also takes place before individual quick freezing of fruits or vegetables. The fruits or vegetables are then frozen using standard commercial IQF processes. Block freezing changes the amount of soak time and creates more variability in calcium levels in the fruit or vegetable.

A soak solution is prepared for soaking the IQF fruits or vegetables. The soak solution may consist of water, sucrose, and calcium salt. Sucrose may be added to a level such that the percentage of soluble solids in the soak solution is equal to the amount of soluble solids in the fruit or vegetable to be soaked. Salt may replace or be combined with sucrose or another sugar in the soak solution. The sucrose or other sugar may be adjusted to match the brix of the fruit or vegetable or desired brix of the finished product. Although an isotonic solution is optimal for soaking, the texture of fruits and vegetables would benefit from a firming soak within a range of soluble solids. In an embodiment, the soak solution may comprise a calcium salt and water solution without sugar. The level of calcium salt in soak solution will be dictated by texture and flavor acceptability. Minimal levels of calcium salt in the soaking solution will improve the texture of the finished product. If the end product has an established Standard of Identity with calcium restrictions, calcium concentrations should not exceed stated levels. The calcium concentration is selected to achieve no more than FDA approved calcium levels in the finished product. Standards of Identity are written in terms of calcium percentage in finished product rather than calcium salt level in ingredients. Therefore, it is important to distinguish between levels of calcium salts and levels of calcium. The calcium lactate pentahydrate salt used in the following embodiments is 13.4-14.5% calcium. The calcium chloride salt is a solution of 37% calcium chloride. Calcium content is approximately 13.4%. The content of calcium in finished product is measured by atomic absorption. Although calcium lactate pentahydrate and calcium chloride were used in experiments other calcium salts may work as well. The soak solution should be kept at a temperature that prevents the IQF product from refreezing into a mass block during the soak.

IQF fruits or vegetables are immersed in the soak solution. Agitation may be required to prevent the IQF product from freezing together. The IQF fruits or vegetables may be soaked for about 18-72 hours at about 35-52° F. The soaking process must be maintained at a temperature of about 35-50° F. to prevent the growth of spoilage microorganisms. After the soak, the fruits or vegetables are drained to remove excess calcium present in the soak solution, at which point, the firming soak process is concluded. The fruit may then be processed as it would under normal commercial processing conditions to reach end products.

BRIEF DESCRIPTION OF THE DRAWINGS

Additional aspects, features, and advantages of the invention, as to its operation, will be understood and will become more readily apparent when the invention is considered in light of the following description of illustrative embodiments made in conjunction with the accompanying drawings, wherein.

DETAILED DESCRIPTION

Illustrative and alternative embodiments and operational details of the firming process to enhance texture of thermally processed IQF fruits and vegetables will be discussed in detail as follows with reference to FIG. 1. Fresh fruits and vegetables are individually quick frozen—a widely used commercial process—to preserve flavor, texture, and nutritional value. Individually quick frozen or "IQF" is used in its ordinary meaning to refer generally to frozen fresh fruits or vegetables that may or may not have been blanched prior to freezing, may be preservative free, and are maintained at a freezing temperature. Thermal processing—after fruits and vegetables are subjected to IQF processing—may substantially degrade texture and firmness. A purpose of the disclosed embodiments is to produce a consumable fruit or vegetable product having an improved or enhanced texture after exposure to texture damaging heat during sterilization. Enhancing texture is achieved as the calcium of the soak solution interacts with naturally occurring elements of the fruit or vegetable. For example, the calcium ions in the soak solution cross-link with pectin to enhance firmness in fruits. Another purpose of the disclosed embodiments is to allow for continuous year-round production with IQF fruits and vegetables to provide high quality shelf ready and shelf stable food products.

The process of the invention may preferably take place in a large scale commercial operation whereby each step may be automated with commercial machinery, carried out manually, or some combination of both.

For this disclosure, the term "fruit" is used in its ordinary meaning to refer generally to any edible reproductive body of a seed plant or succulent plant part. Illustrative examples of fruits include, but are not limited to, blueberries, strawberries, blackberries, peaches, pears, grapes, and the like. Also, the term "vegetables" is used in its ordinary meaning to refer generally to the edible part of an herbaceous plant. Illustrative examples of vegetables include, but are not limited to, peas, carrots, green beans, corn, potatoes, and the like. Fruits and vegetables may be whole, sliced, diced, cubed, cored, pared, shaved, etc.

Figure 1:
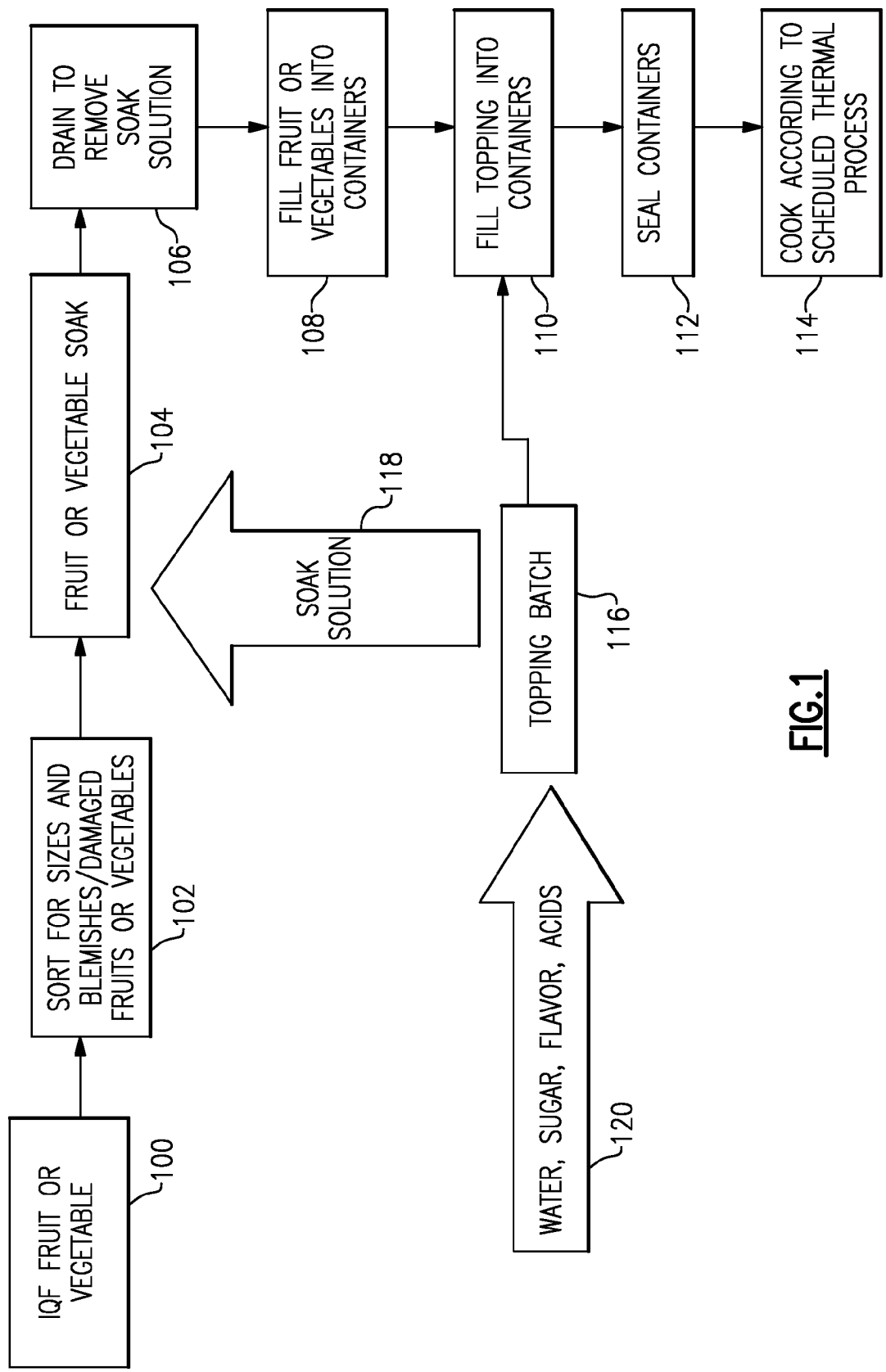
FIG. 1 is a flow chart depicting the process of the invention.

In an illustrative embodiment of the invention shown in FIG. 1, IQF fruits or vegetables 100—previously sorted for size with blemished and damaged ones removed 102—are immersed and soaked 104 in a soak solution to enhance the texture and firmness of the fruit or vegetable. The IQF fruits or vegetables are kept in a frozen or near frozen state at a temperature between about −5° F. to about 30° F. up to the point of immersion in the soak solution contained in a vessel. The vessel may be any food-grade container that can withstand cold temperatures including, but not limited to, buckets, drums, kettles, etc. In an embodiment, the vessel is covered during the soak to avoid microbial contamination or any debris.

The IQF fruits or vegetables may be batched in any commercially practical weight and immersed in any commercially practical volume of soak solution. The ratio of IQF fruit or vegetable to soak solution may be about 1:1 by weight during the soak 104 for full immersion. But the ratio may be adjusted for various fruits and vegetables so that they are fully immersed in the soak solution.

The soak solution may be isotonic and may also be referred to as an isotonic solution or an isotonic sucrose solution in different embodiments. The soak solution may comprise about 80-90% water by weight, about 10-20% sucrose by weight, and about 0.5-1.5% calcium lactate (Puracal PP/USP) by weight. In an embodiment, the soak solution comprises about 86.4% water by weight, about 12.5% sucrose by weight, and about 1.089% calcium lactate by weight. In another embodiment, the soak solution comprises about 87.2% water by weight, about 12% sucrose by weight, and about 0.8% calcium lactate by weight. A food enzyme, such as pectinmethylesterase (Novozyme Novoshape PME), may be added as an optional soak solution ingredient. In yet another embodiment, the soak solution comprises about 85.9% water by weight, about 12.5% sucrose by weight, 0.5% food enzyme (Novozyme Novoshape) by weight, and about 1.089% calcium lactate by weight. The brix of the sucrose in the soak solution may be adjusted to match the brix of the IQF fruit or vegetable to be immersed in the soak solution or the desired brix of the finished fruit or vegetable product. In alternative embodiments, the sucrose ingredient of the soak solution may be replaced with other forms of sugar or other forms of salt. For example, the soak solution may comprise an isotonic solution of salt, sugar, or combination of both. In an embodiment, the soak solution comprises about 90-95% water by weight, about 3-9% sugar by weight, about 0.1-1% sodium salt by weight, and about 0.5-1.5% calcium lactate by weight. In another embodiment, the soak solution comprises about 92.9% water by weight, about 6% sugar by weight, about 0.3% sodium salt by weight, and about 0.8% calcium lactate by weight.

The starting temperature of the soak solution should be kept at a degree that prevents IQF fruits or vegetables from refreezing during the soak. In an embodiment, the starting temperature of the soak solution may be in a range of about 50° F. to about 150° F. prior to immersion of the IQF fruits or vegetables.

IQF fruits or vegetables are immersed in the soak solution 118 to soak 104 for a time period in a range of about 18 hours to about 72 hours. In another embodiment, the time period ranges from about 24 hours to about 48 hours. The soak solution and IQF fruits or vegetables should be maintained throughout the soaking immersion at a temperature ranging from about 32° F. to about 52° F. or more. In yet another embodiment, the temperature of the soak may be 37° F. During the soak 104, the temperature of the soak solution may be maintained by any commercial means including, but not limited to, ambient air, cold or hot water baths, refrigeration, etc.

After soaking the IQF fruits or vegetables, the soak solution is drained from the vessel 106. Draining can occur by way of a sieve, strainer, or commercial machinery including, but not limited to, a dewater belt or the like. Draining can take place immediately before IQF fruits or vegetables are weighed into serving quantities, but no more than about 2 hours before weighing servings into containers. Drained IQF fruits or vegetables may be optionally maintained at a temperature ranging from 32° F. to about 52° F. throughout the weighing process.

Soaked IQF fruit or vegetable quantities are weighed at specified weights, or measured volumetrically to desired volumes, and filled into containers with an opening 108. Containers may comprise any food-grade plastic or other acceptable food-grade material in the form of cans, jars, cups, bowls, bags, pouches, or the like. Serving quantities can be weighed or measured into any desired size. The quantity size depends on the size and nature of the container and the finished product. In an embodiment, the fruit or vegetable serving quantities may fill about 50% to about 60% of the container that they are placed in and fit loosely within the container. Servings may be kept at a temperature ranging from about 32° F. to about 52° F.

A topping 116 is then placed into the container to fill the remaining space within the container and to generally cover the fruit or vegetable 110. The topping may be water or a syrup or juice or brine solution. In an illustrative example, the syrup may comprise water, sugar, and acids, and flavoring may also be added as an optional ingredient 120. In an embodiment, the syrup comprises about 78% water by weight, about 20% sucrose by weight, about 0.3% flavoring by weight, about 0.2% ascorbic acid by weight, and about 0.2% citric acid by weight. In another embodiment, the syrup comprises about 78.75% water by weight, about 20.5% sucrose by weight, about 0.3% flavoring by weight, about 0.228% ascorbic acid by weight, and about 0.225% citric acid by weight. The topping may also comprise a brine solution which may or may not be isotonic. In an embodiment, the brine solution topping may comprise water and a form of salt, such as, for example, sodium or the like.

The topping may be batched and kept at ambient temperature. In an embodiment, the topping is batched and then heated to about 190° F. before filling containers with specified quantities of an IQF fruit or vegetable 116, 120. The brix of the sucrose or other sugar in the topping may be adjusted to meet the brix of the finished product. The topping may be placed in the container within minutes and no later than about 2 hours after soaked fruits or vegetables are placed in the container.

Container openings are then hermetically sealed with or without a film—depending on the nature of the container—using commercial techniques 112. In an embodiment, a film is heat sealed to the container to close the opening. The film may be any food-grade plastic or other acceptable food-grade material. In an alternative embodiment, the container, such as a bag or pouch, is sealed to itself without using a film.

Sealed containers are heated to commercially sterilize IQF fruit or vegetable and topping contents 114. Commercial sterilization may occur in a hot water bath at atmospheric pressure, using a retort to cook at a higher temperature, or any other commercial means suitable for cooking the contents of the container. The container contents should be cooked to commercial sterility in a range of about 180° F. to about 260° F. or higher. And then, the containers are immediately cooled to less than about 100° F.

EXAMPLE 1

In an illustrative example, whole IQF berries were fully immersed at about a 1:1 ratio in an isotonic sucrose solution consisting of about 84% water by weight, about 15% sucrose by weight, and about 0.8% calcium lactate (Puracal PP/USP) by weight in a covered food-grade vessel for about 24 hours at about 35° F. The isotonic sucrose solution was about 70° F. prior to the immersion of IQF berries. After immersion, the isotonic sucrose solution was drained from the vessel for about 5 minutes with a strainer. Specified weights of IQF berries were immediately weighed into serving size quantities, and the servings were placed into 4 ounce plastic food-grade cups to fit loosely within, but filling about 50% of, the cups. The IQF berries were maintained at a temperature of about 40° F. during weighing. About 100 ounces of syrup heated to about 190° F. was added to fill each cup immediately after the cups were filled with IQF berries. The syrup consisted of about 81.7% water by weight, about 17.5% sucrose by weight, about 0.3% flavoring by weight, about 0.228% ascorbic acid by weight, and about 0.225% citric acid by weight. The brix of the sucrose in the syrup was adjusted to meet the brix of the finished IQF berries. Each cup was hermetically heat sealed with a film. The sealed cups were cooked in a water spray retort to about 222° F. to commercially sterilize the IQF berry contents. Once the cook was completed, the cups were immediately cooled to less than about 100° F.

Comparative experiments illustrate various berry textures after processing with prior art practices and after processing with the practices of the invention.

EXAMPLE 2

IQF blueberries (Duke variety) were treated in eight different combinations of defrosting, soak, and calcium treatments to determine the affect of calcium soak on finished product texture. The eight treatments consisted of:
(1) a control of IQF berries—no soak, no calcium salt added, (2) IQF berries soaked in an isotonic sucrose solution (11.3% sucrose), no calcium salts added during the soak or in the topping syrup of the finished product (A in FIG. 2),
(3) IQF berries, unsoaked, with 0.2% calcium chloride solution added in the topping syrup of the finished product (B in FIG. 2),
(4) IQF berries, unsoaked, with 0.18% calcium lactate added in the topping syrup of the finished product (C in FIG. 2),
(5) IQF berries, soaked in an isotonic sucrose solution (11.3% sucrose) no calcium salt for 24 hours, 0.18% calcium lactate added to the topping syrup of the finished product (D in FIG. 2),
(6) IQF berries, soaked in an isotonic sucrose solution (11.3% sucrose) with no calcium salt for 24 hours, 0.2% calcium chloride added in the topping syrup of the finished product (E in FIG. 2),
(7) IQF berries, soaked in an isotonic sucrose solution (11.3% sucrose) with 0.8% calcium lactate solution for 24 hours, no calcium salts added in the topping syrup of the finished product (F in FIG. 2), and
(8) IQF berries, soaked in an isotonic sucrose solution (11.3% sucrose) with 1.1% calcium chloride for 24 hours, no calcium salts added in the topping syrup of the finished product (G in FIG. 2).

All samples were packed into four ounce fruit cups and topped with a light syrup comprised of 77.8% water, 21.7% sugar, and organic acids (0.225% citric acid and 0.228% ascorbic acid) and calcium salts where indicated. The topping syrup and fill weights were consistent throughout all variables. The cups were hermetically sealed and cooked to commercial sterility. For each reading, three cups of blueberries were drained to collect a 150 gram sample of blueberries. Texture was tested using a TAXT 21 texturometer with a 29 pronged probe.

TABLE A

Texture Data

| | | Calcium ppm | Texture g/mm 150 g | Relative Texture |
|---|---|---|---|---|
| 1 | IQF, no soak, no calcium | 36 | 134,279 | 100% |
| 2 | IQF, sucrose soak - no calcium | 65 | 173,124 | 129% |
| 3 | IQF, no soak - calcium chloride added to topping | 675 | 228,405 | 170% |
| 4 | IQF, no soak - calcium lactate added to topping | 279 | 239,990 | 179% |
| 5 | IQF, sucrose soak - calcium lactate added to topping | 281 | 299,903 | 223% |
| 6 | IQF, sucrose soak - calcium chloride added to topping | 712 | 308,136 | 229% |
| 7 | IQF, sucrose and calcium lactate soak | 297 | 342,039 | 255% |
| 8 | IQF, sucrose and calcium chloride soak | 784 | 437,376 | 326% |

Figure 2:
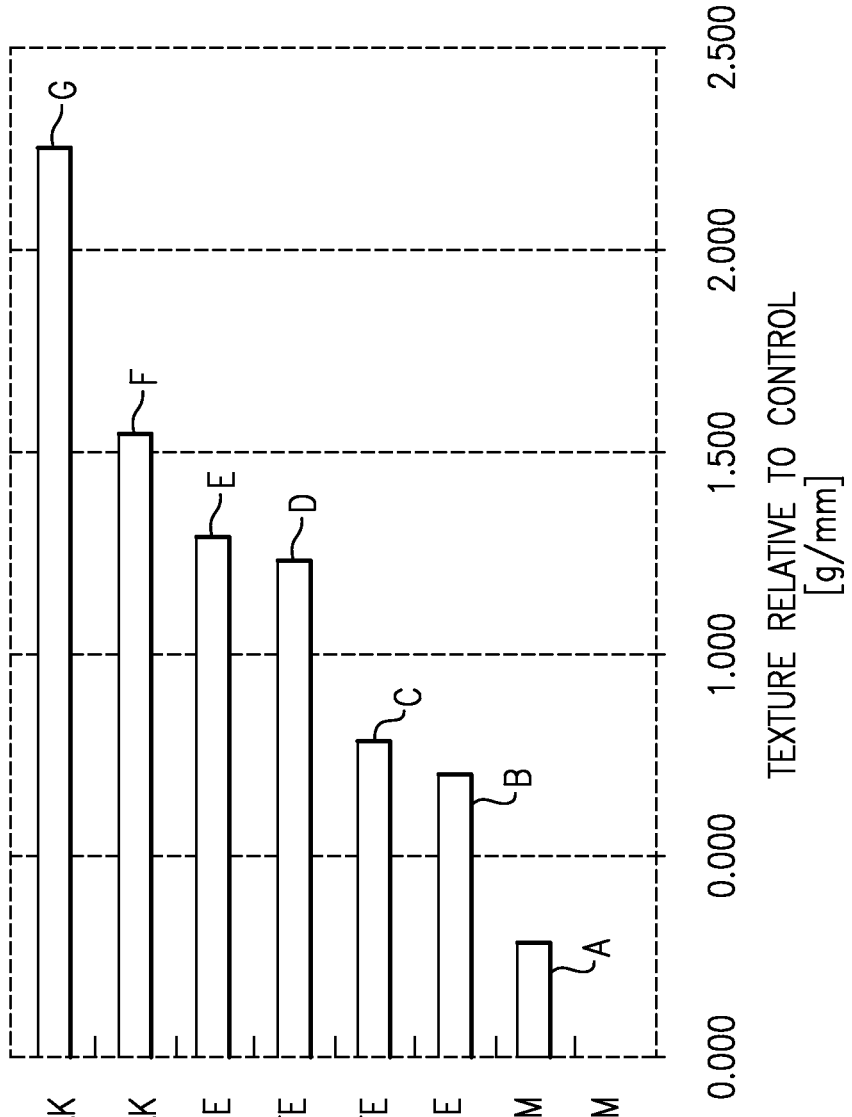
FIG. 2 illustrates relative texture results from the practice of prior art methods compared to the practice of the invention.

As shown in Table A and summarized in FIG. 2, texture results indicate that the highest texture reading was achieved when the berries were treated with calcium salts. This result also suggests that, on a relative basis, firming improves more with exposure to calcium than it does with sucrose, during the soak. FIG. 2 also shows that the soaking method with calcium yields better texture compared to adding calcium salts into the pack media or topping which is widely practiced in the industry.

EXAMPLE 3

IQF blueberries (Duke variety) were treated with three different calcium treatments to compare the results of dosing topping syrup with calcium lactate to calcium lactate/isotonic sucrose soak method with and without PME enzyme. Serving as a control, commercially available canned blueberries (Oregon brand) were evaluated for texture. A can of Oregon brand blueberries in light syrup was drained to collect 100 g of blueberries for the control. The three treatment groups were (a) IQF berries, unsoaked, dosed with 0.08% calcium lactate in the topping syrup of the finished product, (b) IQF berries, soaked in an isotonic sucrose solution (15% sucrose) with 0.8% calcium lactate for 24 hours, no calcium salts added to the topping syrup of the finished product, and (c) IQF berries, soaked in an isotonic sucrose solution (15% sucrose) with 0.8% calcium lactate and 0.5% PME (Novoshapes) for 24 hours, no calcium salts were added to the topping syrup of the finished product.

All samples were packed into four ounce fruit cups and topped with a light syrup comprised of 81.7% water, 17.5% sugar, organic acids (0.225% citric acid and 0.228% ascorbic acid), and flavoring (0.3% natural blueberry flavor). The topping syrup and fill weights were consistent throughout all variables. The cups were hermetically sealed and cooked to commercial sterility. Samples were evaluated organoleptically after production and over time to monitor the affect of storage. Samples were stored six months before texture testing. One set of samples was stored at 65° F. to mimic ambient storage and one set of samples was stored at 85° F. to mimic accelerated storage conditions. For each texture reading, two cups of blueberries for each experiment group were drained to collect a 100 gram sample of blueberries. Texture was tested using the TAXT 21 texturometer with a 29 pronged probe.

TABLE B

Texture Data

| | 65° F. | | 85° F. | | Relative Texture | |
|---|---|---|---|---|---|---|
| Firming Process | Calcium ppm | Texture g/mm- 100 g | Calcium ppm | Texture g/mm- 100 g | 65° F. | 85° F. |
| Oregon blueberries light syrup | 55 | 70,740 | | | 100% | |
| No soak + calcium (a) | 130 | 112,779 | 190 | 129,082 | 159% | 182% |
| Calcium soak (b) | 254 | 214,142 | 266 | 218,252 | 303% | 309% |
| Calcium soak + enzyme (c) | 242 | 261,218 | 187 | 150,724 | 369% | 213% |

Figure 3:
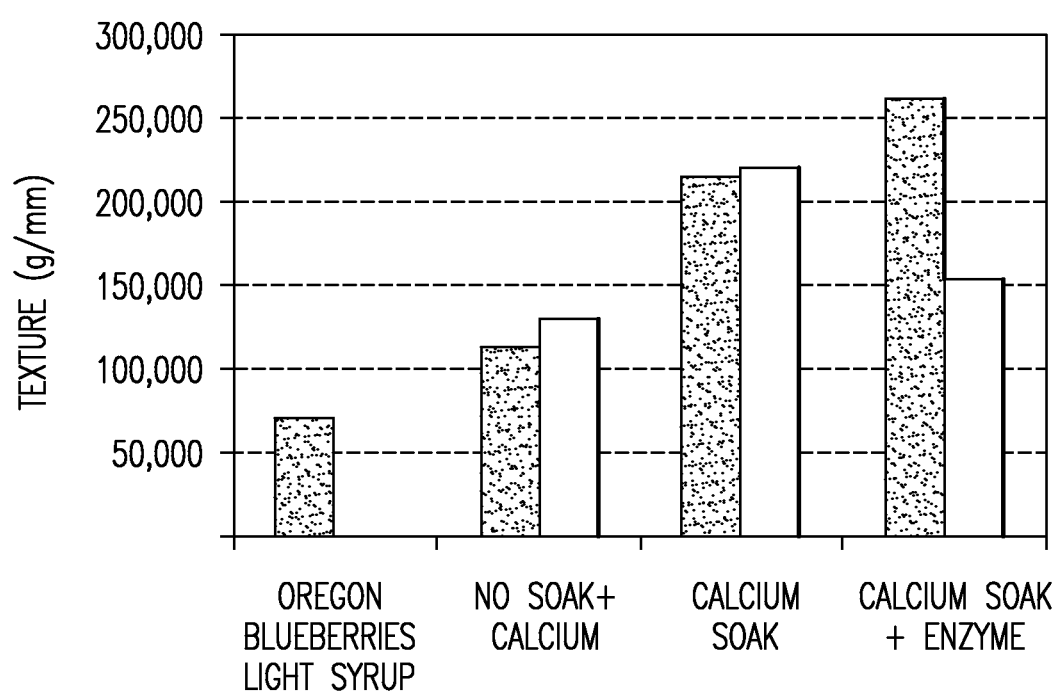
FIG. 3 illustrates texture reading results comparing soaking methods using calcium only vs. calcium with enzyme (PME).

As shown in Table B and summarized in FIG. 3, texture results indicate that the conventional berry products on the market with calcium in syrup topping are significantly softer than the berries treated with the calcium salt soak. FIG. 3 also illustrates texture results showing that the berries soaked in calcium prior to thermal processing had better texture after six months of storage. In some cases, the soaking method using calcium and PME had higher texture readings. However, in sensory tests throughout the six month storage, the texture of the enzyme soaked berries was perceived to be too tough and less appealing.

EXAMPLE 4

Two fruits, IQF blueberries (Duke variety) and IQF diced peaches, were treated with two different treatments to compare the results of soaking fruits in an isotonic sucrose calcium solution with a water and calcium soak solution. The two treatment groups were (a) IQF fruit, soaked in an isotonic sucrose solution (15% sucrose) with 0.8% calcium lactate for 24 hours, no calcium salts added to the topping syrup of the finished products, and (b) IQF fruit, soaked in water with 0.8% calcium lactate for 24 hours, no calcium salts added to the topping syrup of the finished product. Serving as a control, unsoaked IQF fruit was also evaluated for texture.

The blueberry samples were packed into four ounce fruit cups and topped with a light syrup comprised of approximately 80% water, 20% sugar, organic acids (0.225% citric acid and 0.228% ascorbic acid), and flavoring (0.3% natural blueberry flavor). The peach samples were packed into four ounce fruit cups and topped with light syrup comprised of approximately 75% water. The topping syrup and fill weights were adjusted for each variable to meet a target sugar level in the finished product. The cups were hermetically sealed and cooked to commercial sterility. For each texture reading, three cups of blueberries for each experiment group were drained to collect a 150 gram sample of fruit. Texture was tested using the TAXT 21 texturometer with a 29 pronged probe.

TABLE C

Texture Data

| | | Calcium ppm | Texture g/mm 150 g | Relative Texture |
|---|---|---|---|---|
| Blueberries | IQF, no soak, no calcium | 54 | 242,321 | 100% |
| | IQF, isotonic sucrose soak - with calcium | 234 | 733,457 | 303% |
| | IQF, water soak - with calcium | 291 | 815,302 | 336% |
| Peaches | IQF, no soak, no calcium | 36 | 20,061 | 100% |
| | IQF, isotonic sucrose soak - with calcium | 269 | 59,305 | 296% |
| | IQF, water soak - with calcium | 350 | 64,403 | 321% |

Figure 4:
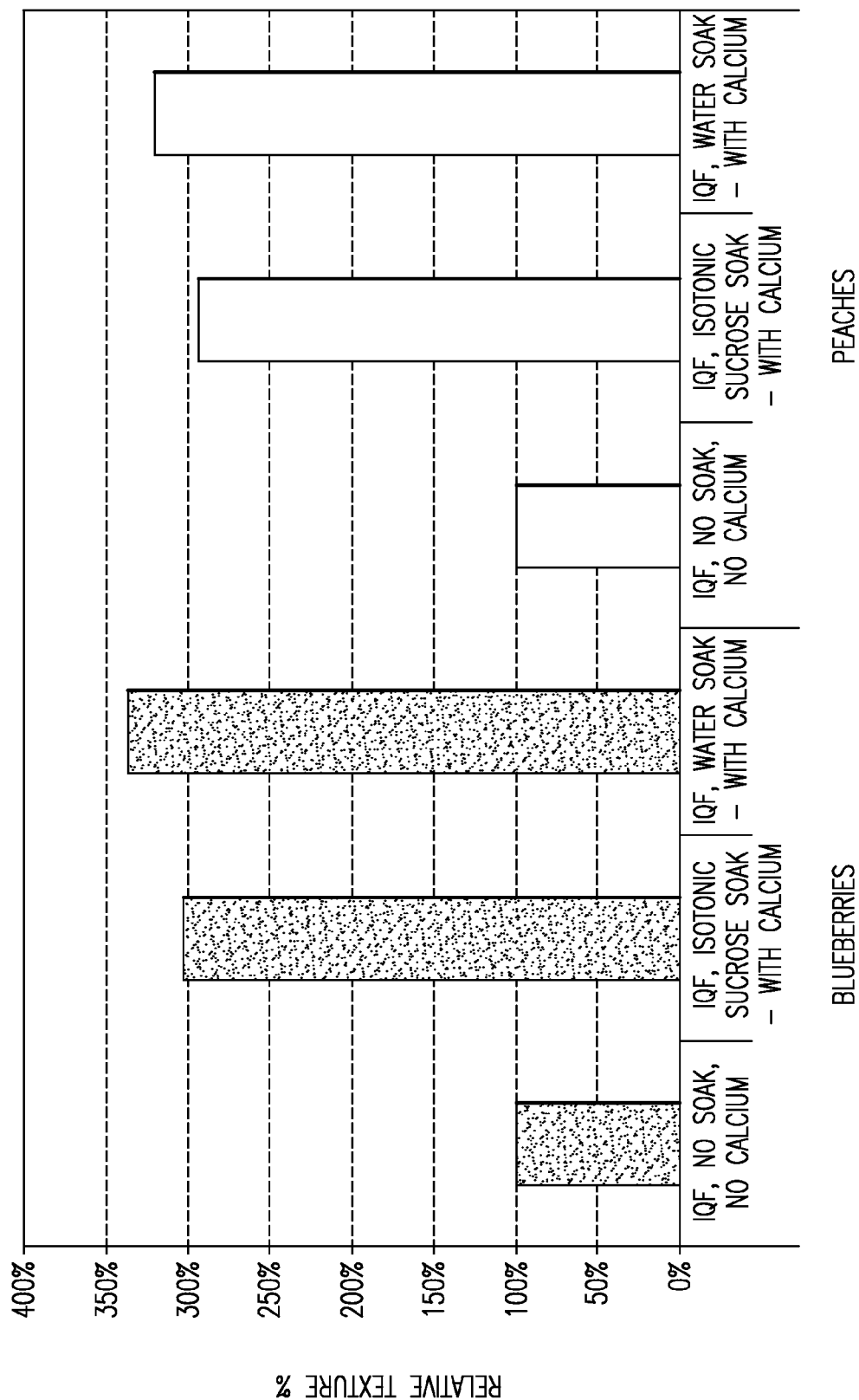
FIG. 4 illustrates relative texture reading results comparing soaking methods using isotonic and water soak.

As shown in Table C and summarized in FIG. 4, texture results indicate that the unsoaked IQF blueberry sample is softer than the samples soaked in isotonic and water calcium solutions.

EXAMPLE 5

Two fruits—IQF blueberries (Duke variety) and IQF diced peaches—were treated with two different treatments to compare the results of soaking fruits in a 0.1% calcium lactate solution with a 0.8% calcium soak solution. The two treatment groups were (a) IQF fruit, soaked in an isotonic sucrose solution (15% sucrose) with 0.1% calcium lactate for 24 hours, no calcium salts added to the topping syrup of the finished product, and (b) IQF fruit, soaked in water with 0.8% calcium lactate for 24 hours, no calcium salts added to the topping syrup of the finished product. Serving as a control, unsoaked IQF fruit was also evaluated for texture.

The blueberry samples were packed into four ounce fruit cups and topped with a light syrup comprised of approximately 80% water, 20% sugar, organic acids (0.225% citric acid and 0.228% ascorbic acid), and flavoring (0.3% natural blueberry flavor). The peach samples were packed into four ounce fruit cups and topped with light syrup comprised of approximately 75% water. The topping syrup and fill weights were adjusted for each variable to meet a target sugar level in the finished product. The cups were hermetically sealed and cooked to commercial sterility. For each texture reading, three cups of blueberries for each experiment group were drained to collect a 150 gram sample of fruit. Texture was tested using the TAXT 21 texturometer with a 29 pronged probe.

TABLE D

Texture Data

| | | Calcium ppm | Texture g/mm 150 g | Relative Texture |
|---|---|---|---|---|
| Blueberries | IQF, no soak, no calcium | 54 | 242,321 | 100% |
| | IQF, isotonic sucrose soak - with 0.1% calcium lactate | 83 | 389,611 | 161% |
| | IQF, isotonic sucrose soak - with 0.8% calcium lactate | 234 | 733,457 | 303% |
| Peaches | IQF, no soak, no calcium | 36 | 20,061 | 100% |
| | IQF, isotonic sucrose soak - with 0.1% calcium lactate | 71 | 44,279 | 221% |
| | IQF, isotonic sucrose soak - with 0.8% calcium lactate | 269 | 59,305 | 296% |

Figure 5:
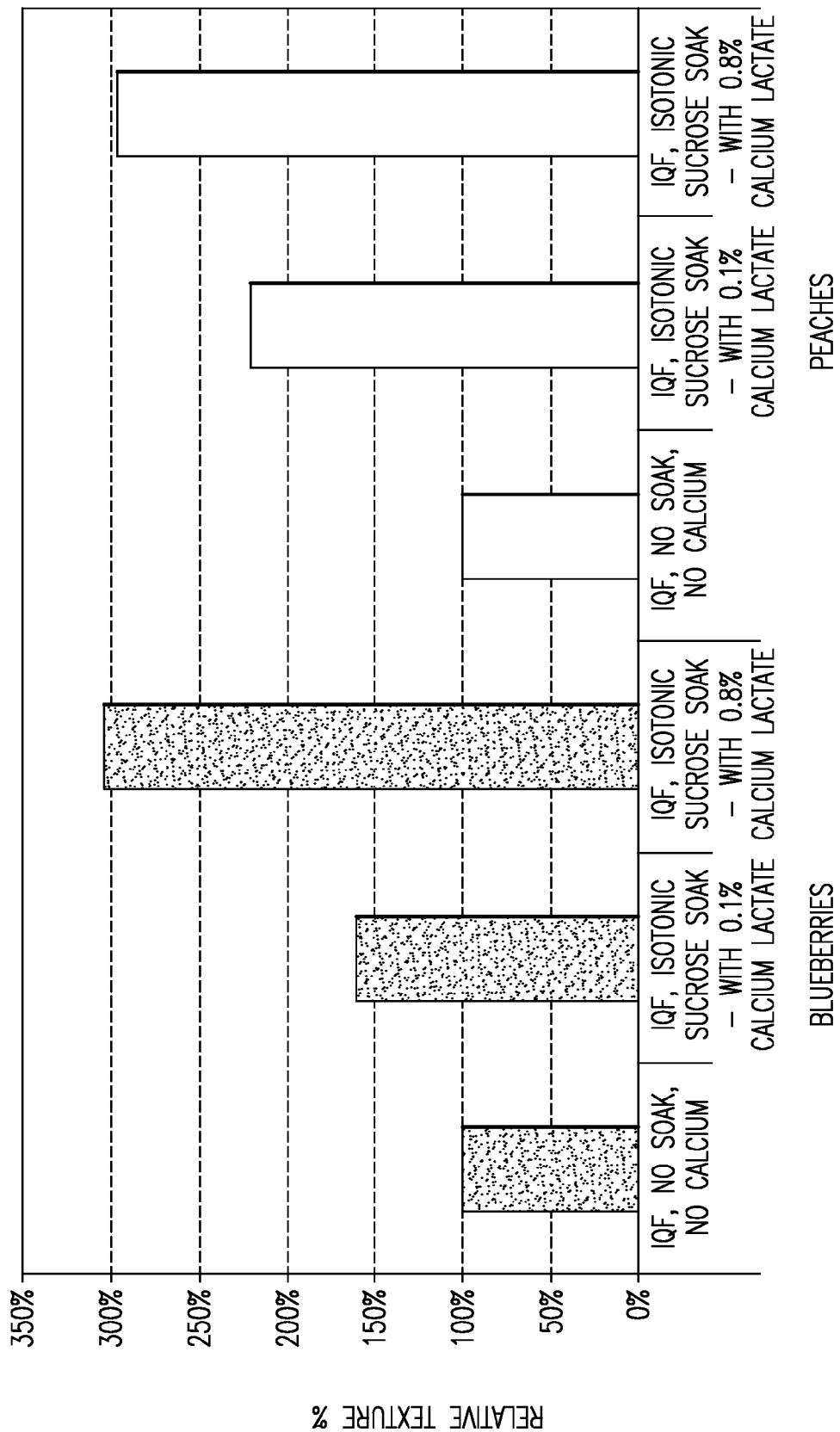
FIG. 5 illustrates relative texture reading results comparing 0.1% calcium lactate and 0.8% calcium lactate soak.

As shown in Table D and summarized in FIG. 5, texture results indicate that the unsoaked IQF blueberry sample is softer than the samples soaked in isotonic solutions with 0.1% and 0.8% calcium lactate. Firming occurred with both levels of calcium addition.

While the invention has been described in conjunction with specific embodiments, it is evident that many alternatives, modifications, permutations, and variations will become apparent to those skilled in the art in light of the foregoing description. Accordingly, it is intended that the invention embraces all such alternatives, modifications and variations as fall within the scope of the claims below.

What is claimed is:

1. A process for enhancing texture of a thermally processed fruit or vegetables comprising:
   providing an isotonic soak solution at a presoak temperature ranging from about 50.degree. F to about 150.degree. F.;
   soaking frozen fruit or vegetable in the isotonic soak solution for about 18 hours to about 48 hours wherein the isotonic soak solution is maintained during soaking the fruit or vegetables at a temperature ranging from about 32.degree. F. to about 52.degree. F. thereby preventing the fruit or vegetables from freezing into a mass block during the soak;
   draining the isotonic soak solution from the fruit or vegetable;
   combining preweighed serving quantities of the fruit or vegetable with a topping in separate containers;
   hermetically sealing each container of the fruit or vegetable combined with the topping; and
   heating the sealed container of fruit or vegetable and topping to achieve commercial sterility and then cooling the fruit or vegetable to less than about 100.degree. F.

2. The process of claim 1 wherein the fruit or vegetables are sliced, diced, cubed, shaved, or whole.

3. The process of claim 1 wherein the fruit or vegetables are frozen at a temperature ranging from about −5.degree. F. to about 30.degree. F. before soaking in the isotonic soak solution.

4. The process of claim 1 wherein the isotonic soak solution comprises about 85% to about 86% water by weight, about 12.5% sucrose by weight, and about 0.1% to about 1.25% calcium salt by weight.

5. The process of claim 1 wherein the isotonic soak solution comprises about 93% water by weight, about 6% sugar by weight, about 0.3% salt by weight, and about 0.8% calcium lactate by weight.

6. The process of claim 1 wherein the soaking occurs at a temperature range of about 37.degree. F. to about 50.degree. F.

7. The process of claim 1 wherein the topping comprises about 78% water by weight, about 20% sucrose by weight, about 0.3% flavoring by weight, about 0.2% ascorbic acid by weight, and about 0.2% citric acid by weight.

8. The process of claim 1 wherein the topping comprises about 98% water by weight and about 1.5% salt by weight.

9. A method of maintaining post-harvest quality of fruits or vegetables comprising:
   immersing frozen fruits or vegetables in an isotonic soak solution comprising calcium ions for about 18 hours to about 48 hours at a temperature ranging from about 32.degree. F. to about 52.degree. F. in order to prevent the fruits or vegetables from freezing into a mass block during immersion in the isotonic soak solution thereby promoting crosslinking of the calcium ions with pectin in the fruits or vegetables during immersion;
   separating the isotonic soak solution from the fruits or vegetables;
   transferring preweighed quantities of the fruits or vegetables into containers;
   suspending the preweighed quantities with a topping in the containers;
   hermetically sealing the containers; and
   cooking the fruits or vegetables in the containers in a water bath to achieve commercial sterility and then cooling the fruit or vegetable to stop the cooking.

10. The process of claim 9 wherein the isotonic soak solution comprises about 85% to about 86% water by weight, about 12.5% sucrose by weight, and about 0.1% to about 1.25% calcium lactate by weight.

11. The process of claim 9 wherein the isotonic soak solution comprises about 93% water by weight, about 6% sugar by weight, about 0.3% salt by weight, and about 0.8% calcium lactate by weight.

12. The process of claim 9 wherein the fruits or vegetables are immersed in the isotonic soak solution at a ratio of about 1:1 by weight for a time period ranging from about 24 hours to about 48 hours at about 37.degree. F.

13. The process of claim 9 wherein the topping comprises about 78% water by weight, about 20% sucrose by weight, about 0.2% ascorbic acid by weight, and about 0.2 citric acid by weight.

14. The process of claim 9 wherein the topping comprises about 98.5% water by weight and about 1.5% salt by weight.

15. A process for improving the texture of thermally processed berries comprising:
   immersing frozen berries in an isotonic soak solution for about 18 hours to 48 hours while maintaining the isotonic soak solution during immersion of the berries at a temperature ranging from about 32.degree. F. to 50.degree. F. in a covered vessel, thereby preventing the berries from freezing into a mass block during immersion in the isotonic soak solution;
   draining the isotonic soak solution from the berries;
   transferring preweighed quantities of the berries into containers;
   suspending the quantities of the berries in a syrup;
   hermetically sealing the berries in the containers; and
   heating the berries and syrup sealed in the containers to achieve commercial sterility and then cooling the berries and syrup to cool the berries and the syrup.

16. The process of claim 15 wherein the step of immersing berries occurs with the isotonic solution at about 37.degree. F. for a time period ranging from about 18 hours to about 48 hours in a covered vessel.

17. The process of claim 15 wherein the isotonic soak solution comprises about 85% to about 86% water by weight, about 12.5% sucrose by weight, and about 0.1% to about 1.25% calcium lactate by weight.

18. The process of claim 17 wherein the sucrose is adjusted to match the amount of sugar in the berries.

19. The process of claim 15 wherein the syrup comprises about 78% water by weight, about 20% sucrose by weight, about 0.2% ascorbic acid by weight, and about 0.2% citric acid by weight.

20. A process for improving the texture of thermally processed berries comprising:
   immersing frozen berries in an isotonic solution comprising calcium ions for about 18 hours to 48 hours while maintaining the isotonic solution during immersion of the berries at a temperature ranging from about 32.degree. F. to 50.degree. F., thereby preventing the berries from freezing into a mass block during immersion;
   draining the isotonic solution from the berries;
   transferring preweighed quantities of the berries into containers;
   suspending the quantities of the berries in a syrup;
   hermetically sealing the berries in the containers; and
   heating the berries and syrup sealed in the containers to achieve commercial sterility.

* * * * *